(No Model.)
G. E. GAY & J. H. PARSONS.
SCREW DRIVER.
No. 246,746. Patented Sept. 6, 1881.
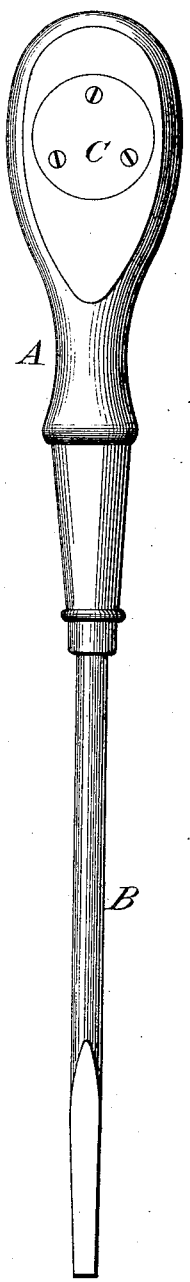
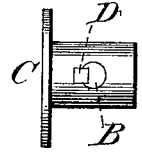
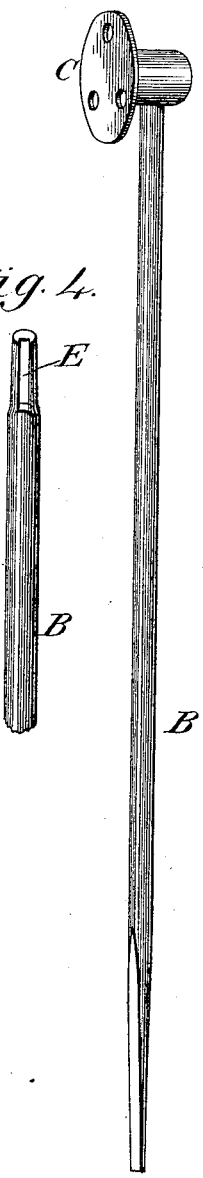
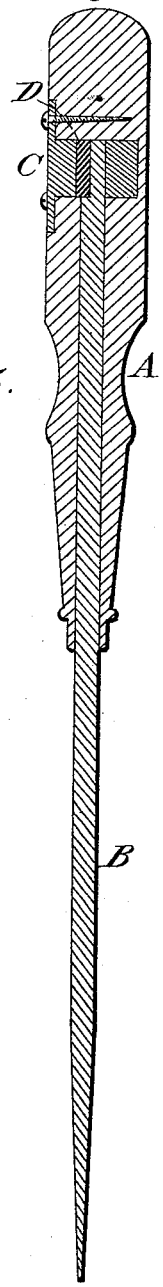
Witnesses:
Edwin C. Dudley
William H. Brook
Inventor:
George E. Gay
John H. Parsons

UNITED STATES PATENT OFFICE.

GEORGE E. GAY AND JOHN H. PARSONS, OF AUGUSTA, MAINE.

SCREW-DRIVER.

SPECIFICATION forming part of Letters Patent No. 246,746, dated September 6, 1881.

Application filed June 4, 1880. (No model.)

*To all whom it may concern:*

Be it known that we, GEO. E. GAY and JNO. H. PARSONS, both citizens of the United States, residing at Augusta, in the county of Kennebec and State of Maine, have invented a new and useful Improvement in Screw-Drivers, of which the following is a full, clear, and exact description, reference being had to the accompanying drawings, forming part of this specification.

The object of our invention is to prevent the shank of a screw-driver from turning in its socket, and at the same time to secure it removably in its place in such a way as to secure greater strength to the handle.

The invention consists in the peculiar method of keying the shank of the blade in a handle provided with a removable plug, as will be hereinafter more fully described.

In the accompanying drawings, Figure 1 is an exterior view of the invention; Fig. 2, a longitudinal section; Fig. 3, the metallic plug secured to the blade; Fig. 4, a portion of the shank, showing key-set; and Fig. 5, a top view of the metallic plug.

A represents a wooden handle, made broad at its upper end for giving it greater strength to resist the strain which is necessarily thrown upon the upper end of the shank of blade B, which is inserted into the usual longitudinal socket.

In common with similar devices, the handle is provided with a transverse recess in one of its lateral faces extending through and beyond the longitudinal socket. In said recess a hard metallic plug, C, cylindrical in form, is removably secured by screws passing through a circular flange, which plug is provided with a diametrical perforation having a key-seat in one side thereof made to correspond with a similar longitudinal key-seat in the surface of the upper end of the shank, so that when the shank is inserted into the socket and perforation and the two seats are in juxtaposition, a key, D, may hold the shank securely and keep it from turning in its socket.

Herotofore shanks have been secured in similar handles by pouring melted lead into the lateral recess; but this is objectionable on the ground that a handle so attached is not removable, and consequently a separate handle is necessary for every blade; and it is well known that a number of such tools are necessary for accommodating screws of different sizes. Besides, the lead, on account of its softness, does not afford so strong and durable a bearing as is furnished by a plug of hard metal.

In inserting the blade into the handle the key is first placed in its seat in the plug and the latter carefully adjusted in the lateral recess. Then the shank is entered at the socket, so that its groove or seat will receive the key and be held simply by frictional contact, so as to be easily removable by the exertion of a slight force.

What we claim is—

A screw-driver consisting in a handle having a removable hard metallic plug, which is provided with a perforation having a key in one side, in combination with a blade having a tang provided with a longitudinal seat in the surface of its upper end, substantially as shown and described, and for the purpose set forth.

GEORGE E. GAY.
JOHN H. PARSONS.

Witnesses:
E. C. DUDLEY,
W. H. BROOKS.